March 17, 1925.

T. J. COSTELLO 1,530,239

METHOD OF OPERATING HEATING FURNACES

Filed May 28, 1921     2 Sheets-Sheet 2

INVENTOR.

Patented Mar. 17, 1925.

1,530,239

UNITED STATES PATENT OFFICE.

THOMAS J. COSTELLO, OF WARREN, OHIO, ASSIGNOR TO TATE-JONES & COMPANY, INC., OF PITTSBURGH, PENNSYLVANIA, A CORPORATION OF PENNSYLVANIA.

METHOD OF OPERATING HEATING FURNACES.

Application filed May 28, 1921. Serial No. 473,436.

REISSUE

*To all whom it may concern:*

Be it known that I, THOMAS J. COSTELLO, a citizen of the United States, residing at Warren, in the county of Trumbull and State of Ohio, have invented a new and useful Improvement in Methods of Operating Heating Furnaces, of which the following is a full, clear, and exact description, reference being had to the accompanying drawings, forming part of this specification, and in which—

Figure 1:
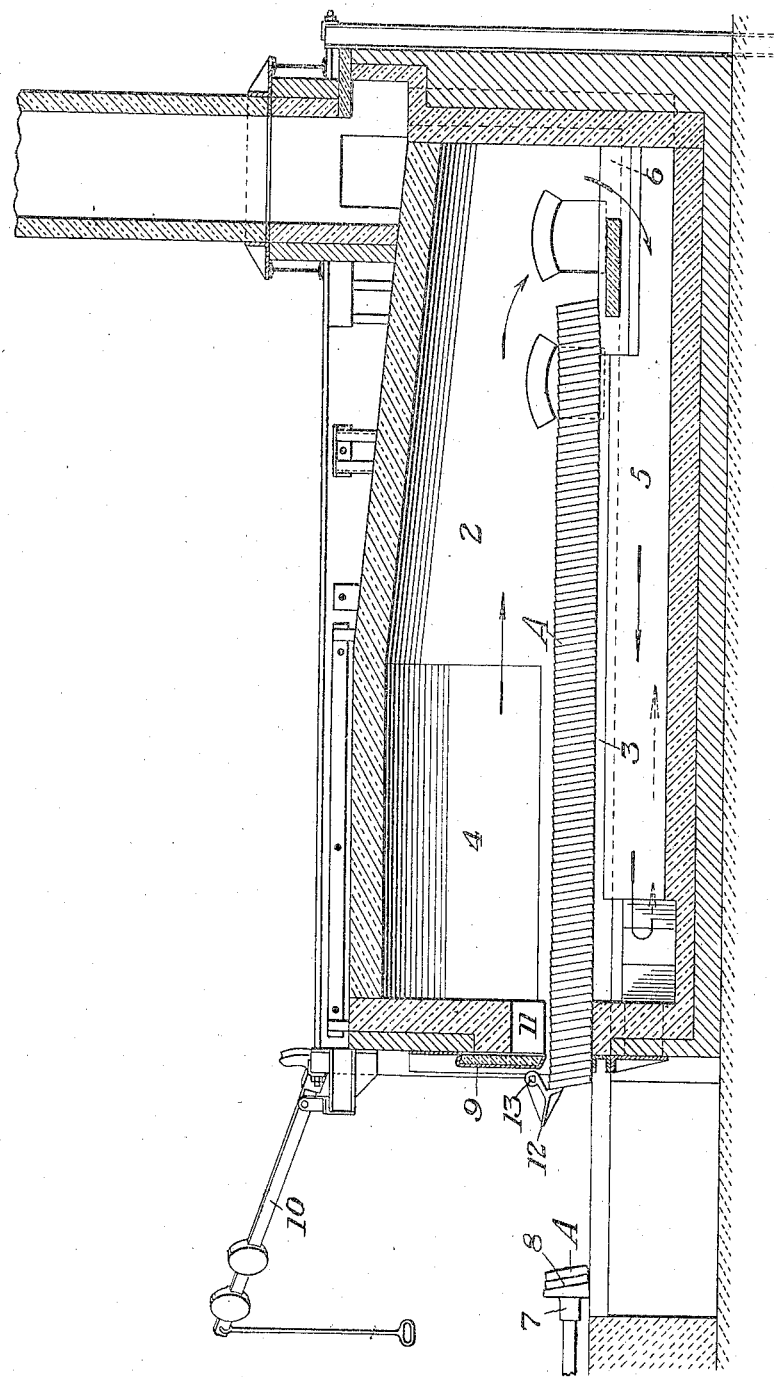
Figure 1 is a longitudinal section illustrating one form of furnace for carrying out my invention.

My invention has relation to the method of operating heating furnaces, and more particularly to the operation of furnaces for heating sheet and tin plate bars, slabs or billets.

One object of the present invention is to utilize the material being heated as a division wall between adjacent heat circulating flues, whereby the opposite sides of the material are directly subjected to the action of the heated products of combustion passing through said flues.

A further object of the invention is to utilize the projections formed on the material during shearing as a separating or spacing means for adjacent billets, bars or slabs.

A still further object is to provide for positioning the bars, billets or slabs in the furnace in such a manner that they are prevented from toppling over and the passage of heat between adjacent bars, billets or slabs is facilitated.

The present application is a division of my pending application Serial No. 420,593, filed October 30, 1920.

It has heretofore been proposed to heat metal billets by feeding them one behind the other into a furnace to form a division wall between adjacent flues and passing the heating medium in the same direction through the flues above and below the billets. Such furnaces are generally known as the "split flame" type.

By the present invention the heating medium is passed over one side of the billets in one direction and then over the other side of the billets in the opposite direction. Furthermore, the billets are preferably spaced to permit the passage of a portion of the heating medium between adjacent billets.

This method of heating is of great advantage as compared with the "split flame" method. In actual practice it is impossible to make half of the flame flow above the steel and the other half below—one of the two passages will always be favored. This generally results in non-uniform heat distribution in the billets; a condition which is fatal to accurate rolling or other operations succeeding the heating. To overcome this a soaking hearth has generally been resorted to. That is, the furnace has been made longer than necessary in an attempt to give the billet time to equalize its heat content by conduction.

In the present invention, the heating medium is passed along one side of the billets in one direction and then it is reversed and passed along the other side in the other direction. The surface which first comes in contact with the heating medium will get hotter than the material last touched thereby since there is necessarily a temperature gradient along the path of the heating medium. Therefore, when a billet first enters the furnace it will be heated more on one side than on the other. This is offset to some extent, however, by the spacing of the billets. The pressure drop through the furnace induces the passage of the heating medium between the billets thereby heating them on all sides and tending to equalize the heat content of a billet by conduction more rapidly than would be the case if the billet were heated on two sides only.

It will be noted that the heating medium reverses itself at the delivery end of the furnace so that as the billets travel through the furnace the gases above and below them approach the same temperature and the billets when delivered are uniformly heated. The reversal of flow of all the heating medium does away with the non-uniformity of heating found in the "split flame" type of furnace and also eliminates the large hearth formerly necessary. It will be understood that a soaking hearth may be used to insure the heating of the core of large billets but it need not be so large as has heretofore been necessary.

Referring to the accompanying drawings in which I have shown a preferred method of carrying out my invention, the numeral 2 designates the heating chamber of a pair-heating furnace of the continuous type. The floor or hearth of the heating chamber is provided with a slide-way 3 for the material to be heated, this slide-way being preferably formed by water-cooled skids. The furnace is provided at one end with a heating chamber (not shown) from which the products of combustion pass through the lateral opening 4 into the heating chamber, above the slide-way. Below the floor or hearth, the furnace is provided with one or more longitudinal flues 5 for the circulation of the heated products of combustion in a reverse direction, this flue or flues communicating at the delivery end of the furnace with the heating chamber above the slide-way through a suitable opening or openings 6. A particular furnace which I prefer to employ is more fully shown and described in my said application Serial No. 420,593.

7 designates any suitable pusher device for pushing the bars, billets or slabs A to be heated, into and through the heating chamber 2, this pusher being formed with a sloping face 8 for maintaining the bars, etc., in an inclined position, as shown. 9 designates any suitable door, and 10 any suitable actuating mechanism therefor, this door closing the entrance opening 11 into the heating chamber. 12 designates a retaining device, which is shown as being in the form of a hooked arm pivoted at 13 and adapted to fall by gravity into engagement with the outermost bar or slab and hold the same at the inclination given it by the pusher 7. The lower face of this hooked arm is beveled so that as the bars or slabs are pushed thereunder by action of the pusher, the arm will readily move upwardly and permit the passage thereof. Immediately thereafter, the arm will drop downwardly to catch the last bar or slab in the manner clearly shown in Figures 1 and 2, thus maintaining the entire series thereof in inclined positions. The bars or slabs being set on edge in this manner, their inclination prevents the leading bars or slabs from toppling over, and insures their passage through the furnaces in such inclined positions.

It will also be noted that the flue or flues 5 are open at the top, the bars or billets forming in effect the top wall of such flue or flues, and a division wall between the said flue or flues and the heating space above the bars or billets. In this manner the heated products of combustion are first caused to pass longitudinally above the bars or billets and thence backwardly in contact with the lower edges of the same, thus giving a very effective and uniform heating action, as well as utilizing considerable heat which would otherwise be passed to the stack and be lost.

Figure 2:
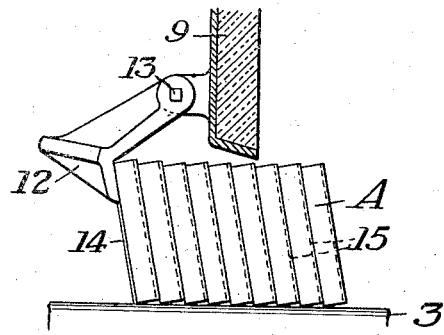
Figure 2 is a detail view, partly in end elevation and partly in section, showing the positioning of the billets.
Figure 3:
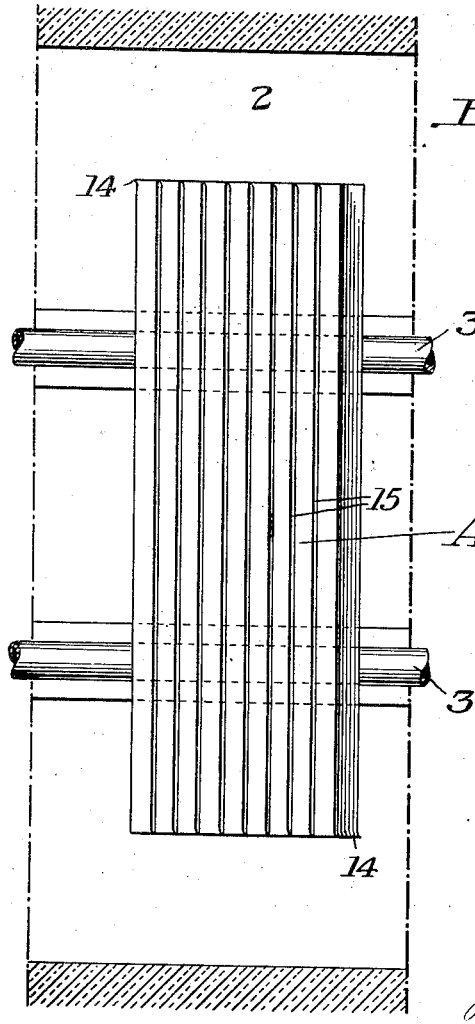
Figure 3 is a sectional plan view, also showing the positioning of the billets in the furnace.

By reference to Figures 2 and 3, it will be noted that the burrs 14 which are formed during the shearing operation are utilized for separating or spacing adjacent bars or billets so as to provide narrow passages 15 between them, these passages permitting the direct passage of a portion of the products of combustion from the heating chamber into the flue or flues 5. It has been found that by reason of the relatively small area of these passages, oxidation of the flat surfaces of the material is prevented, and that due to the more intimate contact with the heated products of combustion, the period necessary for proper heat penetration and uniform heating may be considerably reduced. The passage of the products of combustion directly between the adjacent bar or slabs is facilitated by the use of the open top flue or flues 5, so that the material itself forms the division wall between oppositely moving currents of the heating medium.

In operation, heating gases enter the furnace through the opening 4 and move toward the right, as viewed in Figure 1 above the billets and as indicated by arrows. As they move in this direction a certain portion of the gases passes between the billets on account of the openings provided by the burrs thereon, while the remainder of the heating gases travel to the right hand end of the furnace, then downwardly and to the left underneath the billets. The gases which find their way between the billets also pass into this flue 5 from which all the gases travel to the stack, as indicated by the dotted arrow. The heated billets are removed in any convenient manner at the right hand end of the furnace, the leading billet of the advancing line being preferably removed and the remaining line moved forward.

While I have illustrated one manner of carrying out my invention it will be understood that I am not limited to the form shown as the invention may be otherwise embodied within the scope of the following claims.

I claim:

1. The method of heating billets, comprising feeding the billets into a heating furnace, and maintaining all of said billets similarly inclined within said furnace, substantially as described.

2. The method of heating billets, comprising feeding the billets into a heating furnace, and utilizing the burrs formed on said billets during shearing for maintaining the billets in spaced relation, substantially as described.

3. The method of heating billets, comprising feeding the billets into a heating furnace, utilizing the burrs formed on said billets during shearing for maintaining the billets in spaced relation, and maintaining said billets in inclined position, substantially as described.

4. The method of heating billets, comprising feeding said billets into a heating furnace, causing said billets to form a division wall between adjacent flues, and passing a heating medium through said flues, said billets being held in spaced relation by the burrs formed thereon during shearing, substantially as described.

5. The method of heating billets, comprising feeding said billets into a heating furnace in inclined position, causing said billets to form a division wall between adjacent flues, and passing a heating medium through said flues, substantially as described.

6. The method of heating billets, comprising feeding said billets into a heating furnace, causing said billets to form a division wall between adjacent flues, and passing a heating medium in succession first through one of said flues in one direction on one side of the billets, for substantially the entire length of the charge of billets in the furnace, then to the opposite side of said billets to another of said flues, and then through said last mentioned flue in a direction opposite to the direction of travel through the first mentioned flue, for substantially the entire length of the charge of billets in the furnace, substantially as described.

7. The method of heating billets, comprising feeding said billets into a heating furnace, causing said billets to form a division wall between adjacent flues, and passing a heating medium in succession first through one of said flues in one direction on one side of the billets, then to the opposite side of said billets to another of said flues, and then through said last mentioned flue in a direction opposite to the direction of travel through the first mentioned flue, the heating medium being introduced to and taken from the flues adjacent the same end of the furnace for substantially the entire length of the charge of billets in the furnace, substantially as described.

8. The method of heating billets, comprising feeding said billets into a heating furnace, causing said billets to form a division wall between adjacent flues, and introducing a heating medium into said furnace and causing it to initially travel through one of said flues in the direction of travel of the billets through the furnace, the heating medium being introduced to and taken from the flues adjacent the same end of the furnace, substantially as described.

9. The method of heating billets, comprising feeding said billets into a heating furnace, causing said billets to form a division wall between adjacent flues, introducing a heating medium into said furnace, causing said medium to initially travel through one of said flues in the direction of the travel of the billets through the furnace, and then causing said medium to pass to the opposite side of said billets and travel through another of said flues in a direction opposite to its direction of travel through said first mentioned flue, the heating medium being introduced to and taken from the flues adjacent the same end of the furnace, substantially as described.

10. The method of heating billets which includes feeding billets into a heating furnace, passing a heating medium through the furnace over one side of the billets, and then changing its direction and passing it back through the furnace over the other side of the billets, meanwhile allowing a portion of the heating medium to pass between the billets, and removing the billets from the furnace adjacent the end where the direction of travel of the heating medium is changed, the heating medium being introduced to and taken from the flues adjacent the other end of the furnace, substantially as described.

11. The method of heating billets which includes feeding billets in a row into a heating furnace, passing a heating medium through the furnace over one side of the billets, passing it around the foremost billet and back over the other side of the billets, meanwhile allowing a portion of the heating medium to pass between the billets, removing the foremost billet and advancing the remaining billets by inserting a cold billet at the other end of the row, the heating medium being introduced to and taken from the flues adjacent the end of the furnace where the cold billets are introduced, substantially as described.

12. The method of heating billets which includes feeding billets in a row into a heating furnace, passing a heating medium through the furnace over one side of the billets, passing it around the foremost billet and back over the other side of the billets, removing the foremost billet and advancing the remaining billets by inserting a cold billet at the other end of the row, the heating medium being introduced to and taken from the flues adjacent the end of the furnace where the cold billets are introduced, substantially as described.

13. The method of heating billets which includes passing a heating medium first over one side of a row of billets in one direction and then over the opposite side of the billets and in the opposite direction, meanwhile allowing a portion of the heating medium to pass between the billets, substantially as described.

14. The method of heating billets which includes passing a heating medium first over one side of a row of spaced billets in one direction and then over the opposite side of the billets and in the opposite direction, substantially as described.

15. The method of heating billets which includes supplying a heating medium to one side of a row of spaced billets, passing portions of the medium between different billets of the row at different points along the length of the row, the gases being first passed along the side of the row where the gases enter a sufficient distance to reach the points where the various portions pass between the billets and then in a reverse direction along the side of the billets opposite the side first in contact with the heating medium, substantially as described.

16. The method of heating billets which includes supplying a heating medium to one side of a row of spaced billets, passing portions of the medium between different billets of the row at different points along the length of the row, the gases being first passed along the side of the row where the gases enter a sufficient distance to reach the points where the various portions pass between the billets and then in a reverse direction along the side of the billets opposite the side first in contact with the heating medium and providing an excess of heating medium above the quantity passing between the billets, said excess passing over that side of the row first in contact with the heating medium, reversing its direction at the end of the row of billets and passing through the opposite side, substantially as described.

17. The method of heating billets, comprising feeding the billets into a heating furnace, and maintaining a plurality of said billets inclined in the same direction and supported in a common plane within the furnace, substantially as described.

18. The method of heating billets, comprising feeding the billets into a heating furnace, and maintaining a plurality of said billets within and transversely of the furnace and inclined in the same direction therein, substantially as described.

19. The method of heating sheet bars, comprising supporting the bars on edge with the edges in a common plane and the bars in adjacent relationship and in an inclined position, feeding the bars while so inclined and so supported into a heating furnace, and maintaining the bars in inclined position within said furnace, substantially as described.

20. The method of heating bars, comprising placing the bars in side by side inclined relationship outside of the furnace and extending transversely thereof, feeding the bars into a furnace while so inclined, and maintaining the bars in inclined position within the furnace, substantially as described.

21. In the method of heating bars, the steps comprising placing the bars in side by side inclined relationship outside of the furnace, feeding said bars into the furnace in a direction to extend transversely thereof, and maintaining all of said bars inclined within the furnace whereby the bars are mutually effective for protecting the side surfaces thereof, substantially as described.

22. A method of heating bars, comprising feeding the bars into side by side relationship in a furnace with the lower edges of adjacent bars resting on a common support in substantially a common plane, and maintaining a plurality of the bars inclined relatively to said support in said furnace, substantially as described.

In testimony whereof, I have hereunto set my hand.

THOMAS J. COSTELLO.